(12) United States Patent
Moriya et al.

(10) Patent No.: US 9,708,992 B2
(45) Date of Patent: Jul. 18, 2017

(54) VEHICLE CONTROL SYSTEM

(71) Applicant: TOYOTA JIDOSHA KABUSHIKI KAISHA, Toyota-shi, Aichi-ken (JP)

(72) Inventors: Naoto Moriya, Toyota (JP); Hideo Watanabe, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/257,035

(22) Filed: Sep. 6, 2016

(65) Prior Publication Data
US 2017/0067403 A1 Mar. 9, 2017

(30) Foreign Application Priority Data
Sep. 7, 2015 (JP) .................... 2015-175420

(51) Int. Cl.
| *B60W 10/04* | (2006.01) |
| *F02D 41/02* | (2006.01) |
| *F02P 5/04* | (2006.01) |
| *F02D 41/14* | (2006.01) |
| *F16H 63/50* | (2006.01) |
| *F16H 3/66* | (2006.01) |

(52) U.S. Cl.
CPC ..... *F02D 41/0225* (2013.01); *F02D 41/1454* (2013.01); *F02P 5/045* (2013.01); *F16H 63/50* (2013.01); *F16H 3/666* (2013.01); *F16H 2200/0052* (2013.01); *F16H 2200/201* (2013.01); *F16H 2200/2051* (2013.01); *F16H 2200/2074* (2013.01); *F16H 2200/2089* (2013.01)

(58) Field of Classification Search
CPC .. F02D 41/0225; F02D 41/1454; F02P 5/045; F16H 2200/2089; F16H 63/50; F16H 2200/0052; F16H 2200/201; F16H 2200/2051; F16H 2200/2074; F16H 3/666
See application file for complete search history.

(56) References Cited

U.S. PATENT DOCUMENTS

| 5,643,133 A * | 7/1997 | Minowa ............... B60W 10/06 477/102 |
| 6,000,378 A * | 12/1999 | Minowa ............... B60W 10/06 123/436 |
| 6,213,913 B1 * | 4/2001 | Hirakata ............. F02D 41/0225 123/406.44 |

(Continued)

FOREIGN PATENT DOCUMENTS

| JP | H11-170892 A | 6/1999 |
| JP | 2000-170586 A | 6/2000 |
| JP | 2003-214216 A | 7/2003 |

*Primary Examiner* — David J Hlavka
(74) *Attorney, Agent, or Firm* — Andrews Kurth Kenyon LLP (57) ABSTRACT

A vehicle control system is provided to prevent an occurrence of an engine misfire which may be caused by an execution of ignition retard during lean-burn operation of an engine. The vehicle control system is configured to determine a starting point of an inertia phase when a shifting operation is demanded in the lean-burn mode. The vehicle control system is further configured to switch from the lean-burn mode to the stoichiometric mode before the starting point of the inertia phase, and to execute an ignition retard of the engine in the stoichiometric mode.

2 Claims, 8 Drawing Sheets

(56) References Cited

U.S. PATENT DOCUMENTS

| | | | |
|---|---|---|---|
| 6,352,490 B1* | 3/2002 | Makki | B60W 10/06 123/295 |
| 2002/0174852 A1* | 11/2002 | Choi | B60W 10/06 123/339.11 |
| 2009/0181823 A1* | 7/2009 | Moriya | F02D 41/0225 477/111 |

* cited by examiner

|  | C1 | C2 | C3 | C4 | B1 | B2 | B3 | B4 | F0 | F1 | F2 | F3 |
|---|---|---|---|---|---|---|---|---|---|---|---|---|
| P |  |  |  |  |  |  |  |  |  |  |  |  |
| R |  |  | ○ |  | ◎ |  |  | ○ |  | ○ |  |  |
| N |  |  |  |  |  |  |  |  |  |  |  |  |
| 1st | ○ |  |  | ◎ |  |  |  | ◎ | ○ |  |  | ○ |
| 2nd | ○ |  |  | ◎ |  | ◎ | ○ |  | ○ | ○ | ○ |  |
| 3rd | ○ |  | ○ | ◎ | ◎ |  | ● |  | ○ | ○ |  |  |
| 4th | ○ | ○ | ● | ◎ |  |  | ● |  |  | ○ |  |  |
| 5th | ● | ○ | ○ |  | ○ |  | ● |  |  |  |  |  |
| 6th | ● | ○ |  |  | ● | ○ | ● |  |  |  |  |  |

VEHICLE CONTROL SYSTEM

CROSS REFERENCE TO RELATED APPLICATIONS

The present invention claims the benefit of priority to Japanese Patent Application No. 2015-175420 filed on Sep. 7, 2015 with the Japanese Patent Office, the entire contents of which are incorporated herein by reference in its entirety.

BACKGROUND

Field of the Disclosure

Embodiments of the present application relates to the art of a vehicle control system configured to control an internal combustion engine and an automatic transmission that changes an input speed from the internal combustion engine.

Discussion of the Related Art

In the conventional lean-burn engines, air/fuel ratio can be altered between stoichiometric ratio in which the engine is run at the stoichiometric point and lean-burn ratio in which a ratio of fuel to air is decreased to save the fuel.

However, torque drop may be caused during transition from the stoichiometric ratio to the lean-burn ratio. In order to prevent such torque drop, an idle speed of the engine is raised by increasing an opening degree of an ISC (i.e., Idle Speed Control) valve.

During execution of the above-explained idle speed control, an engine speed may be raised abruptly by a delay in a closing motion of the ISC valve when shifting a gear stage of a transmission. JP-A-2000-170586 describes an engine control device configured to retard an ignition timing of the lean-burn engine run with the lean-burn ratio during shifting of the transmission.

JP-A-11-170892 describes a vehicle control device configured to inhibit a switching of air/fuel ratio between the lean-burn ratio and the stoichiometric ratio during shifting a gear stage of the transmission, or to inhibit a shifting of the gear stage during switching the air/fuel ratio. According to the teachings of JP-A-11-170892, the control device inhibits both of the shifting operation of the gear stage and the switching operation of the air/fuel ratio when a driver intends to accelerate a vehicle.

JP-A-2003-214216 also describes a control device and a control method of the lean-burn engine. According to the teachings of JP-A-2003-214216, a switching demand of air/fuel ratio from the stoichiometric ratio to the lean-burn ratio is limited if an engine load is fluctuated by an accelerating operation, a clutch operation, or a speed change operation.

During the lean-burn operation of the engine, since the ratio of the fuel to the air is decreased, an engine misfire may be caused as a result of ignition retard. In order to prevent such engine misfire, a conventional torque-down control may be effective. However, the torque-down control may result in a delayed response of the vehicle.

SUMMARY

Aspects of embodiments of the present application have been conceived noting the foregoing technical problems, and it is therefore an object of the present application is to provide a vehicle control system configured to prevent an occurrence of an engine misfire, which may be caused by an execution of ignition retard during the lean-burn operation of the engine.

The present invention relates to a vehicle control system that is applied to a vehicle comprising: an engine in which an operating mode can be switched between a stoichiometric mode in which an air/fuel ratio is set to a stoichiometric ratio, and a lean-burn mode in which the air/fuel ratio is set to a lean-burn ratio; and a transmission that changes an input speed from the engine. In order to achieve the above-explained objective, according to the embodiment of the present application, a controller is configured to determine a starting point of an inertia phase in which an input speed of the transmission is changed from a speed in a current gear stage toward a speed in the gear stage to be achieved after a shifting operation of the gear stage of the transmission, when the shifting operation is demanded during propelling the vehicle in the lean-burn mode. In addition, the controller is further configured to switch the operating mode of the engine from the lean-burn mode to the stoichiometric mode before the starting point of the inertia phase, and execute an ignition retard of the engine during propelling the vehicle in the stoichiometric mode.

In a non-limiting embodiment, the controller may be further configured to determine a required time to switch the air/fuel ratio between the stoichiometric ratio and the lean-burn ratio based on at least an air intake of the engine, and to start switching the air/fuel ratio from the lean-burn ratio to the stoichiometric ratio before the starting point of the inertia phase.

According to the embodiment of the present application, therefore, a length of time to propel the vehicle in the lean-burn mode can be extended as long as possible so that the fuel consumption can be reduced as much as possible. In addition, the ignition retard of the engine may be carried out at an appropriate timing to prevent a misfire of the engine.

Further, since the air/fuel ratio is switched from the lean-burn ratio to the stoichiometric ratio before the commencement of the inertia phase and the ignition retard of the engine is executed in the stoichiometric mode, a timing of the torque down resulting from an execution of a clutch-to-clutch shifting may be controlled accurately.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
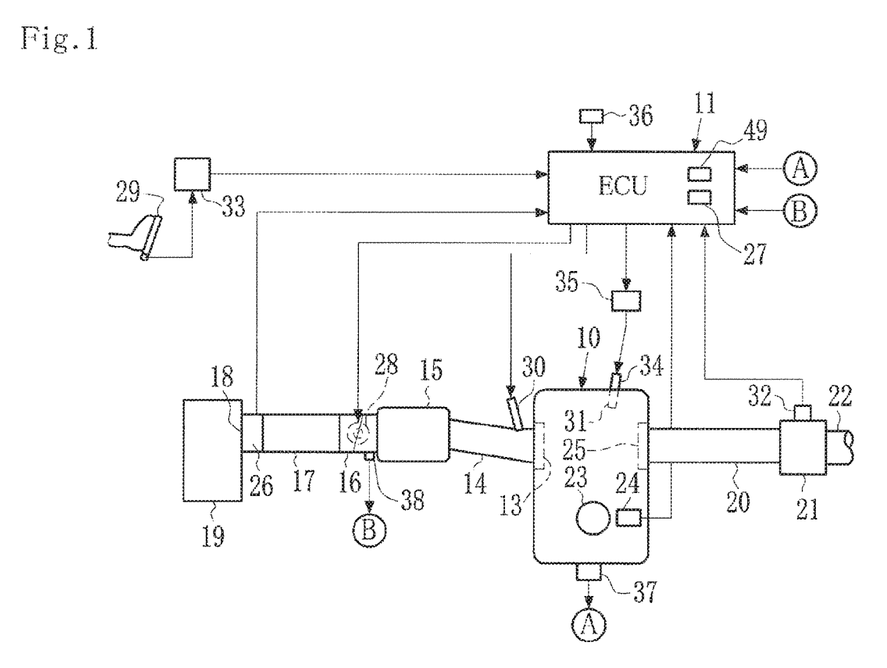
FIG. 1 is a schematic illustration showing one example of an internal combustion engine to which the control system according to the embodiment is applied.

Preferred embodiments of the present application will now be explained with reference to the accompanying drawings. Turning now to FIG. 1, there is shown one example of a lean-burn engine (as will be simply called the "engine") 10 used in a vehicle to which the vehicle control system according to the embodiment is applied. An air/fuel ratio of air/fuel mixture may be switched by an electronic control unit (to be abbreviated as the "ECU" hereinafter) 11 between stoichiometric ratio in which fuel is combusted stoichiometrically, and lean-burn ratio in which a ratio of the fuel to air is decreased. The stoichiometric ratio is selected within a mid-low engine load range, and the lean-burn ratio is selected within a high engine load or when the engine 10 is at an idle speed. Optionally, a richer air/fuel ratio than the stoichiometric ratio may also be selected when starting the engine 10 or when accelerating the vehicle.

Specifically, the engine 10 is an internal combustion engine having a plurality of cylinders, and each intake port 13 of the cylinder is individually connected to an intake manifold 14. In FIG. 1, only one of the intake ports 13 is depicted for the sake of illustration. A unified end of the intake manifold 14 is connected to an air chamber 15, and the air chamber 15 is connected to an intake pipe 17 through a throttle body 16. An air cleaner 19 is attached to an air inlet 18 of the intake pipe 17.

Each exhaust port 25 of the cylinder of the engine 10 is individually connected to an exhaust manifold 20, and a unified end of the exhaust manifold 20 is connected to the exhaust pipe 22 through a catalyst 21.

The engine 10 is provided with a signal disc plate 23 having a scale such as protrusions or slits formed on an outer circumference to indicate a crank angle, and a crank angle sensor 24 that reads the scale of the signal disc plate 23 rotated integrally with a crankshaft (not shown) to detect a crank angle and a rotational speed of the crankshaft.

An airflow sensor 26 is attached to the air cleaner 19 to detect an air intake (i.e., an air suction amount) of the engine 10. The throttle body 16 is provided with a throttle valve 28 whose opening degree can be controlled independent of a depression of an accelerator pedal 29, and the opening degree of the throttle valve 28 is detected by a throttle opening sensor 38.

An injector 30 is disposed on the intake manifold 14 at a portion close to the intake port 13, and an ignition plug 31 is arranged in a combustion chamber of the engine 10. In addition, a temperature sensor 32 is attached to the exhaust manifold 20 to detect a floor temperature of the catalyst 21.

The ECU 11 comprises a throttle opening controller 27 that controls an opening degree of the throttle valve 28. The engine 10 is further provided with an engine speed sensor 37 that detect a speed of the engine 10, and a depression of the accelerator pedal 29 is detected by a depression sensor 33. Detection signals of the crank angle sensor 24, the airflow sensor 26, the temperature sensor 32, the engine speed sensor 37, the throttle opening sensor 38, the depression sensor 33 and so on are sent to the ECU 11. Specifically, the throttle opening controller 27 is configured to control an opening degree of the throttle valve 28 in such a manner as to optimize an air intake based on the incident signals from the above-mentioned sensors. An ignitor 35 is connected to an ignition coil 34 of the ignition plug 31, and an ignition timing of the air/fuel mixture in the cylinder by the ignition plug 31 and a fuel injection by the injector 30 are controlled by the ECU 11.

Specifically, the ECU 11 adjust an ignition timing to the so-called MBT (Minimum advance for the Best Torque) timing in such a manner that the air/fuel mixture in the combustion chamber is ignited when the crankshaft is advanced to an angle at which the maximum cylinder pressure will occur. To this end, a sensor for detecting an internal pressure in the cylinder is arranged in each cylinder. In addition, a temperature of coolant water is detected by a water temperature sensor 36, a speed of the engine 10 is detected by an engine speed sensor 37. Detection signals of the water temperature sensor 36 and the engine speed sensor 37 are also sent to the ECU 11.

The ECU 11 switches the air/fuel ratio from the stoichiometric ratio to the lean-burn ratio upon satisfaction of a predetermined condition. In other words, the ECU 11 switches an operating mode of the engine 10 from stoichiometric mode to lean-burn mode upon satisfaction of a condition to switch the air/fuel ratio from the stoichiometric ratio to the lean-burn ratio.

For example, the condition to switch the air/fuel ratio from the stoichiometric ratio to the lean-burn ratio includes an elapsed time from startup of the engine 10, a load on the engine 10, a temperature of the coolant, a vehicle speed and so on.

Specifically, the condition to switch the air/fuel ratio from the stoichiometric ratio to the lean-burn ratio is satisfied upon the satisfaction of all the following conditions such as: (1) the elapsed time from startup of the engine 10 has exceeded a predetermined period of time (e.g., from 20 to 40 seconds); (2) the engine load falls within a mid-low engine load range (to be called the "lean-burn range); (3) warm-up of the engine 10 has been completed; and (4) the vehicle speed is lower than a predetermined speed (e.g., lower than 120 km/h).

In order to determine a satisfaction of the condition to switch the air/fuel ratio from the stoichiometric ratio to the lean-burn ratio, the ECU 11 comprises a determiner 49. If any one of the above-explained conditions is not satisfied, the air/fuel ratio will not be switched from the stoichiometric ratio to the lean-burn ratio. Optionally, other conditions may be employed to determine alteration of the air/fuel ratio according to need.

Thus, the ECU 11 controls the air/fuel ratio, the fuel injection, the opening degree of the throttle valve, the ignition timing etc. based on the incident signals from the foregoing sensors. Here, the ignition retard of the engine 10 may also be executed to suppress an input torque of the automatic transmission during shifting of a gear stage.

Although the port injection engine 10 in which the air/fuel mixture is injected to the cylinder is depicted in FIG. 10, a gasoline direct injection engine in which the fuel is injected directly to the cylinder separately from air may also be used as the engine 10. In addition, fuel includes gasoline, ethanol, ethanol/gasoline mixture, hydrogen, diesel and so on.

Figure 2:
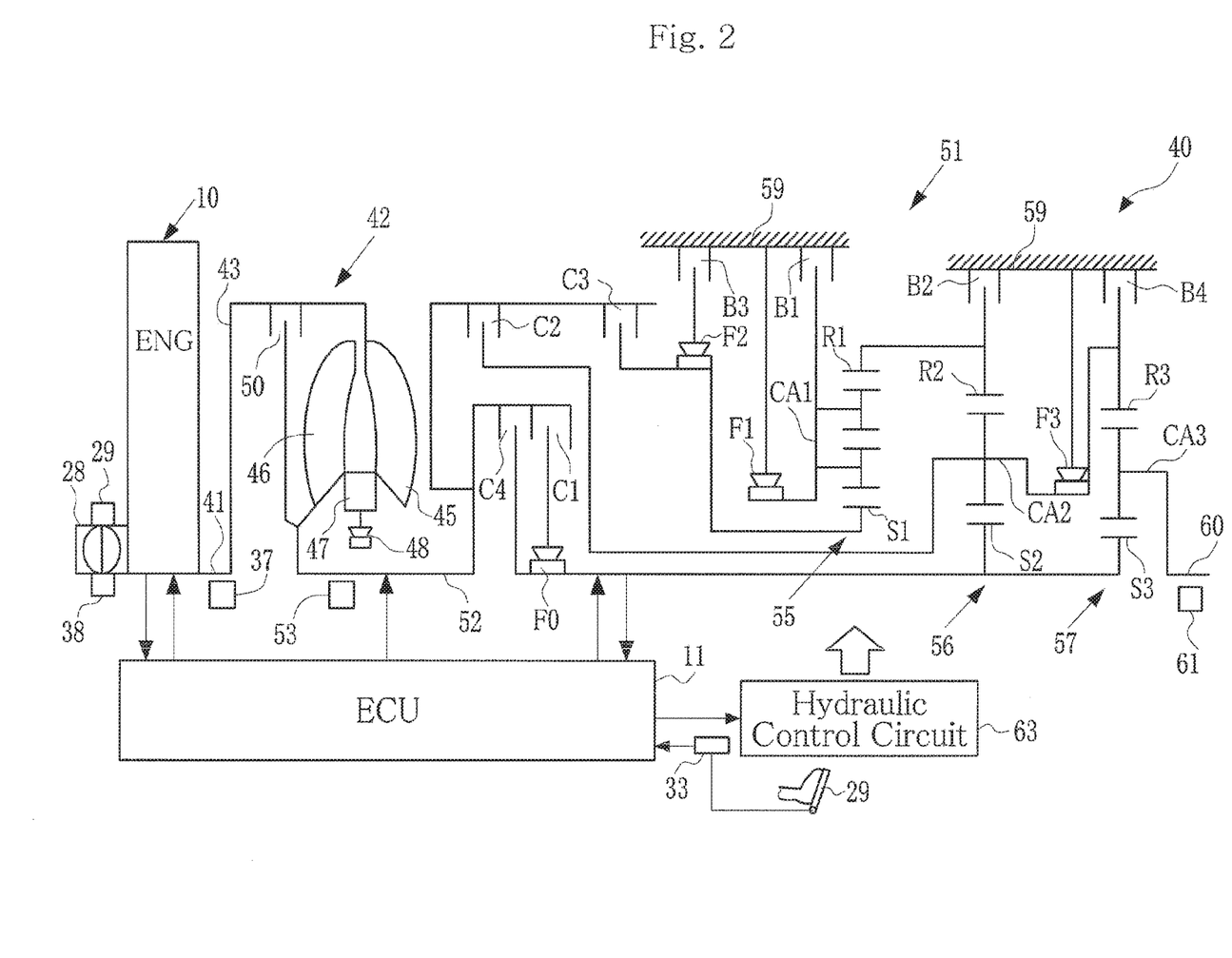
FIG. 2 is a schematic illustration showing one example of an automatic transmission to which the control system according to the embodiment is applied.

Turning to FIG. 2, there is shown one example of a powertrain for delivering drive force of the engine 10 to drive wheels (not shown). As depicted in FIG. 2, a torque converter 42, an automatic transmission (as will be simply called the "transmission" hereinafter) 51, a hydraulic control circuit 63, the ECU 11 and so on are disposed on the powertrain. Here, it is to be noted that lower half of the powertrain is omitted in FIG. 2 for the sake of illustration, and detailed explanation for the elements in common with FIG. 1 will be omitted by allotting common reference numerals thereto.

The engine 10 comprises a crankshaft 41 as an output shaft that is connected to an input shaft 43 of the torque converter 42. The engine speed sensor 37 is disposed in the vicinity of the crankshaft 41 to detect a rotational speed of the crankshaft 41 as an engine speed.

The torque converter 42 transmits torque between a pump impeller 45 of an input side and a turbine runner 46 of an output side through fluid. In order to multiply the transmission torque of the torque converter 42, a stator 47 is interposed between the pump impeller 45 and the turbine runner 46, and to this end, a rotational direction of the stator 47 is restricted to one direction by a one-way clutch 48.

The torque converter 42 is provided with a lockup clutch 50, and the pump impeller 45 and the turbine runner 46 are rotated integrally by engaging the lockup clutch 50 completely with an inner surface of a cover of the torque converter 42. The turbine runner 46 is allowed to rotate slower than the pump impeller 45 by reducing an engagement pressure of the lockup clutch 50 to bring the lockup clutch 50 into slip engagement. To this end, the engagement pressure applied to the lockup clutch 50 is controlled based on a control signal sent to the torque converter 42 from the ECU 11. The torque converter 42 is connected to an input shaft 52 of the transmission 51. A rotational speed of the turbine runner 46 of the torque converter 42 is detected by a turbine speed sensor 53.

The transmission 51 is formed by combining a double pinion first planetary gear unit 55, a single pinion second planetary gear unit 56, and a single pinion third planetary gear unit 57.

In the first planetary gear unit 55, a sun gear S1 is connected to the input shaft 52 through a clutch C3. The sun gear S1 is also connected selectively to a housing 59 through a one-way clutch F2 and a brake B3 while being prevented from rotating in a direction opposite to a rotational direction of the input shaft 52. A carrier CA1 is also connected selectively to the housing 59 through a brake B1, and an inverse rotation of the carrier CA1 is prevented by a one-way clutch F1 disposed in parallel to the brake B1. A ring gear R1 is formed integrally with a ring gear R2 of the second planetary gear unit 56, and also connected selectively to the housing 59 through a brake B2.

A sun gear S2 of the second planetary gear unit 56 is formed integrally with a sun gear S3 of the third planetary gear unit 57 and also connected selectively to the input shaft 52 through a clutch C4. Alternatively, the sun gear S2 may also be connected selectively to the input shaft 52 through a one-way clutch F0 and a clutch C1, and in this case, the sun gear S2 is prevented from rotating in a direction opposite to a rotational direction of the input shaft 52.

A carrier CA2 of the second planetary gear unit 56 is formed integrally with a ring gear R3 of the third planetary gear unit 57. The carrier CA2 is connected selectively to the input shaft 52 through a clutch C2, and connected selectively to the housing 59 through a brake B4. An inverse rotation of the carrier CA2 is prevented by a one-way clutch F3 disposed in parallel to the brake B4. A carrier CA3 of the third planetary gear unit 57 is formed integrally with an output shaft 60, and a rotational speed (i.e., an output speed) is detected by an output speed sensor 61.

A gear stage of the transmission 51 is shifted by controlling engagement pressures applied to the above-explained frictional engagement elements such as the clutches C1 to C4 and the brakes B1 to B4 by the ECU 11 through the hydraulic control circuit 63.

The frictional engagement elements include both single plate and multiple plate clutches and brakes actuated by a hydraulic actuator, and a belt type brake.

The hydraulic control circuit 63 is switched in such a manner as to change engagement states of the clutches C1 to C4 and the brakes B1 to B4 by selectively energizing linear solenoid valves (not shown) and on/off solenoid valves.

A gear stage of the transmission 51 is shifted to a desired stage by a clutch-to-clutch shifting. To this end, the ECU 11 transmits hydraulic commands to the hydraulic control circuit 63 to determine a torque transmitting capacity of the frictional engagement element currently in engagement to establish the current gear stage (that is, a torque transmitting capacity of the frictional engagement element to be disengaged), and to determine a torque transmitting capacity of the frictional engagement element to be engaged to shift the gear stage by the clutch-to-clutch shifting (that is, a torque transmitting capacity of the frictional engagement element to be engaged).

A way of controlling the transmission 51 is changed depending on a shift pattern such as power-on upshift, power-off upshift, power-on downshift, and power-off downshift. Specifically a torque transmitting capacity of the engagement element to be disengaged and a torque transmitting capacity of the engagement element to be engaged (i.e., a progression of the clutch-to-clutch shifting) are controlled in accordance with the above-mentioned shift pattern. To this end, a control map determining torque transmitting capacities of the engagement elements in such a manner as to optimize a shifting time while reducing a shift shock is prepared in advance based on a result of in-vehicle research, and a shifting operation of the transmission 51 is carried out with reference to the control map.

The transmission 51 is rotated not only by a power of the engine 10 but also a torque from drive wheels (not shown). For example, the power-on upshift is executed when the accelerator pedal 29 is depressed to increase an output power of the engine 10, and the engagement elements of the transmission 51 are engaged and disengaged while causing a slip.

According to the embodiment, during execution of the power-on upshift of the transmission 51, the air/fuel ratio is switched from the lean-burn mode to the stoichiometric mode before carrying out an ignition retard of the engine 10 to reduce an output torque of the engine 10. That is, in the lean-burn operation, a misfire of the engine 10 may be caused by executing the ignition retard. In this case, therefore, the air/fuel ratio is switched to the stoichiometric ratio before executing the ignition retard so as to prevent such a misfire, and the air/fuel ratio is kept to the stoichiometric ratio until the completions of the power-on upshift and the ignition retard. Such control of the air/fuel ratio may also be executed during execution of shifting operation of different pattern without switching the air/fuel ratio. For example, the air/fuel ratio is switched from the lean-burn ratio to the stoichiometric ratio when the power-on upshift is caused by depressing the accelerator pedal 29 abruptly. In this case, however, the condition to switch the air/fuel ratio to the lean-burn ratio is not satisfied.

Figure 3:
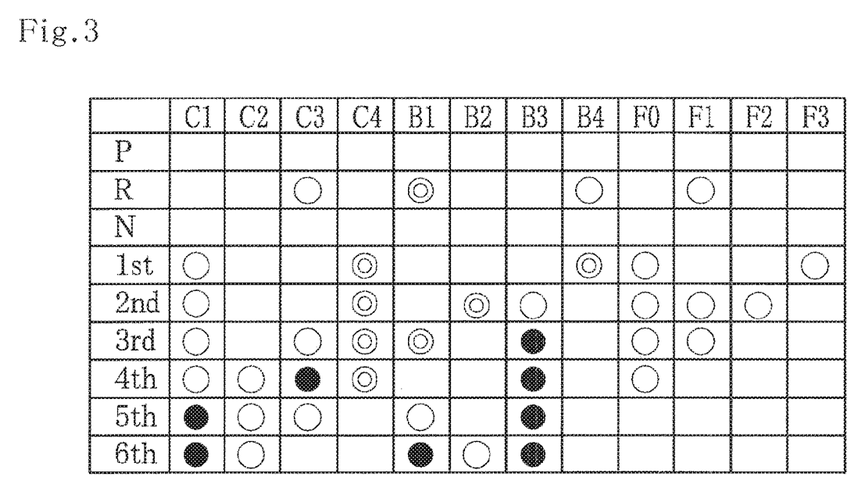
FIG. 3 is a table showing engagement states of engagement elements of the transmission.

Turning to FIG. 3, there is shown a table indicating engagement states of the engagement elements of the transmission 51 in each of the gear stage. In FIG. 3, "○" represents engagement of the element involved in torque transmission, "⊙" represents engagement of the element to establish an engine brake, "●" represents engagement of the element not involved in torque transmission, and blank represents disengagement of the element.

As shown in FIG. 3, a forward stage of the transmission 51 may be selected from the 1st stage in which a reduction ratio is maximum to the 6th stage in which the reduction ratio is minimum. In FIG. 3, "P" represents the parking stage, "R" represents the reverse stage and "N" represents the neutral stage. The forward stages are selected by moving a shift lever (not shown) to "D" position, and a gear stage of the transmission 51 is shifted automatically among the above-mentioned six stages during forward propulsion of the vehicle. Likewise, the gear stage of the transmission 51 is shifted to the parking stage by moving the shift lever to the "P" position, to the reverse stage by moving the shift lever to the "R" position, and to the neutral stage by moving the shift lever to the "N" position.

For example, the 1st stage that is selected when launching the vehicle is established by engaging the clutch C1 and the one-way clutches F0 and F3. An upshift from the 1st stage to the 2nd stage is achieved by further engaging the brake B3, and the one-way clutches F1 and F2 while disengaging the one-way clutch F3.

Figure 4:
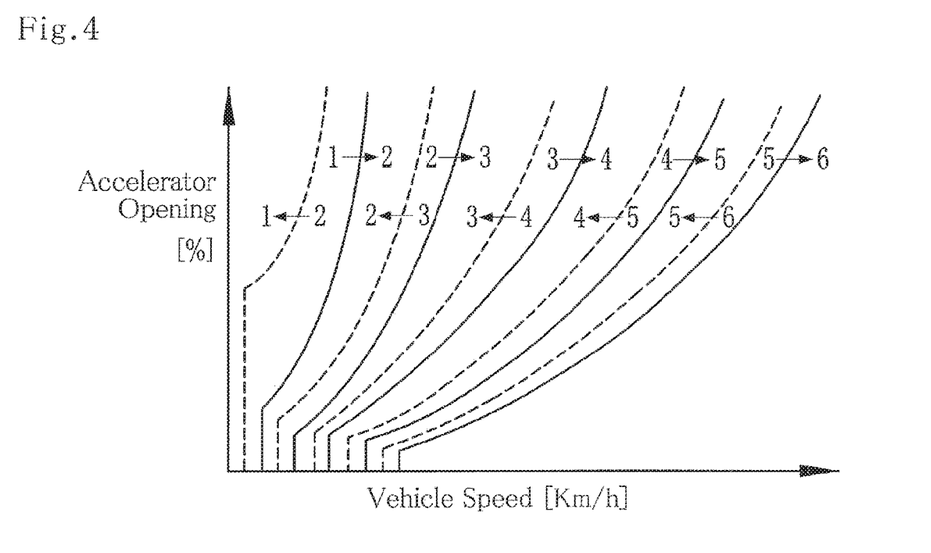
FIG. 4 is a shifting diagram of the transmission.

Turning to FIG. 4, there is shown one example of a shift map for determining a gear stage of the transmission 51 based on a vehicle speed and an accelerator opening that is stored into a ROM 66 of the ECU 11. In the shift map shown in FIG. 4, each solid curve is an upshift line and each dashed line is a downshift line. Specifically, an upshift of the transmission 51 is executed when a shift point determined based on a vehicle speed and a depression of the accelerator pedal 29 (indicated as "accelerator opening" in FIG. 4) is changed upwardly across the upshift line. Likewise, a downshift of the transmission 51 is executed when the shift point is changed downwardly across the downshift line.

Figure 5:
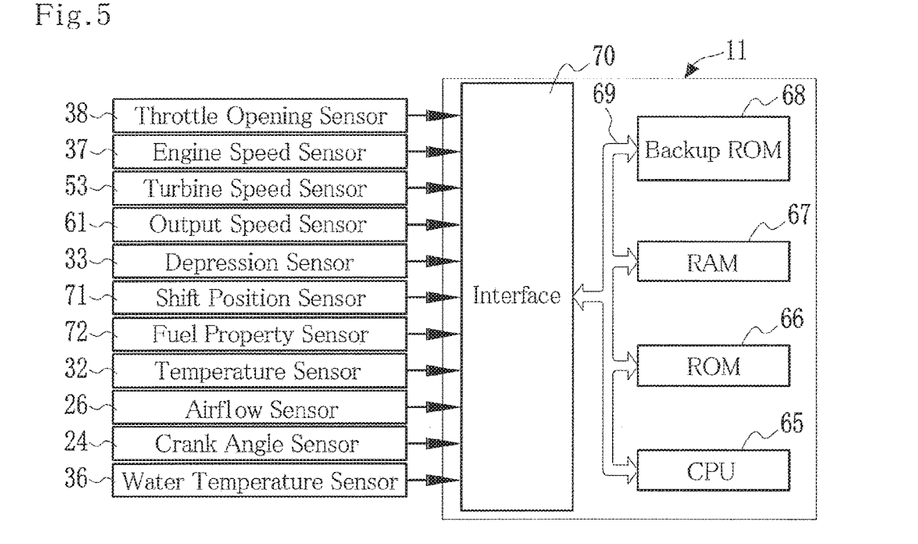
FIG. 5 is a schematic illustration showing an electronic control unit.

As shown in FIG. 5, the ECU 11 comprises a CPU (i.e., Central Processing Unit) 65, a ROM (i.e., Read Only Memory) 66, a RAM (i.e., Random Access Memory) 67, and a backup RAM 68. Specifically, the CPU 65 executes a calculation based on programs and maps stored into the ROM 66, and calculation results of the CPU 65 and the incident data from the sensors are temporarily stored into the Ram 67. The backup RAM 68 is a non-volatile RAM for storing data during cessation of engine operation. The CPU 65, the ROM 66, the Ram 67 and the backup RAM 68 are communicatably connected to each other and to an interface 70 through a bus 69.

The above-mentioned throttle opening sensor 38, engine speed sensor 37, turbine speed sensor 53, output speed sensor 61, depression sensor 33, temperature sensor 32, airflow sensor 26, crank angle sensor 24, and water temperature sensor 36 are also connected to the interface 70. In addition, a shift position sensor 71 that detects a position of the shift lever, and a fuel property sensor 72 that is disposed between a fuel tank (not shown) and the engine 10 to detect fuel property are connected to the interface 70.

Figure 6:
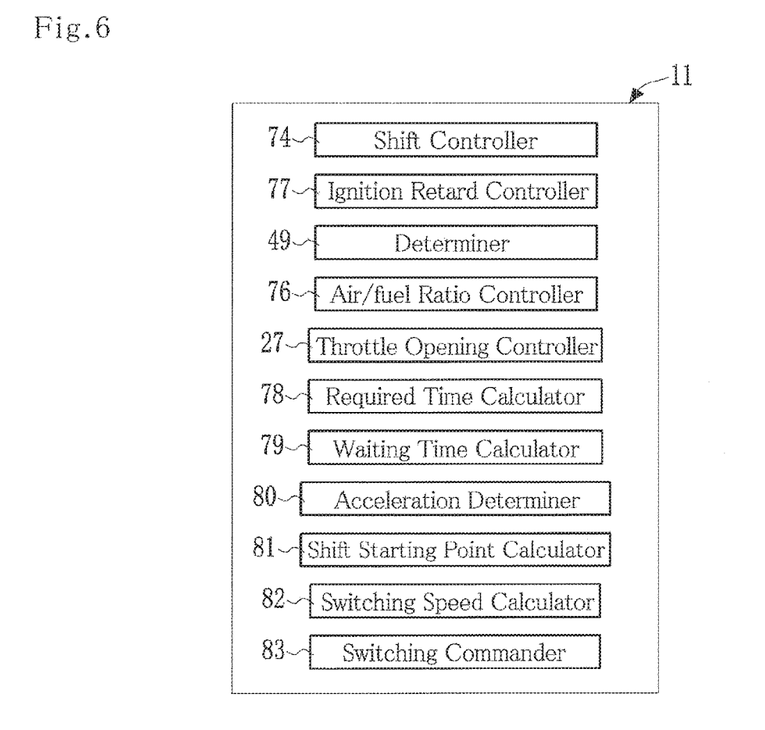
FIG. 6 is an explanatory chart showing functions of the electronic control unit.

FIG. 6 shows functions of the ECU 11 in detail. As described, in the ECU 11, CPU 65 is operated based on the incident data and the programs stored into the ROM 66. Specifically, in addition to the above-mentioned throttle opening controller 27, the ECU comprises a shift controller 74, an ignition retard controller 77, a determiner 49, and an air/fuel ratio controller 76. The ECU 11 further comprises a required time calculator 78, a waiting time calculator 79, an acceleration determiner 80, a shift starting point calculator 81, a switching speed calculator 82, and a switching commander 83.

Specifically, the shift controller 74 calculates a vehicle speed based on an incident signal from the output speed sensor 61, and an opening degree of the throttle valve 28 based on an incident signal from the throttle opening sensor 38. The shift controller 74 determines a target gear stage based on the calculated vehicle speed and a depression of the accelerator pedal 29 with reference to the shift map shown in FIG. 4, and determines to carry out a shifting operation to the target gear stage as necessary.

Figure 7:
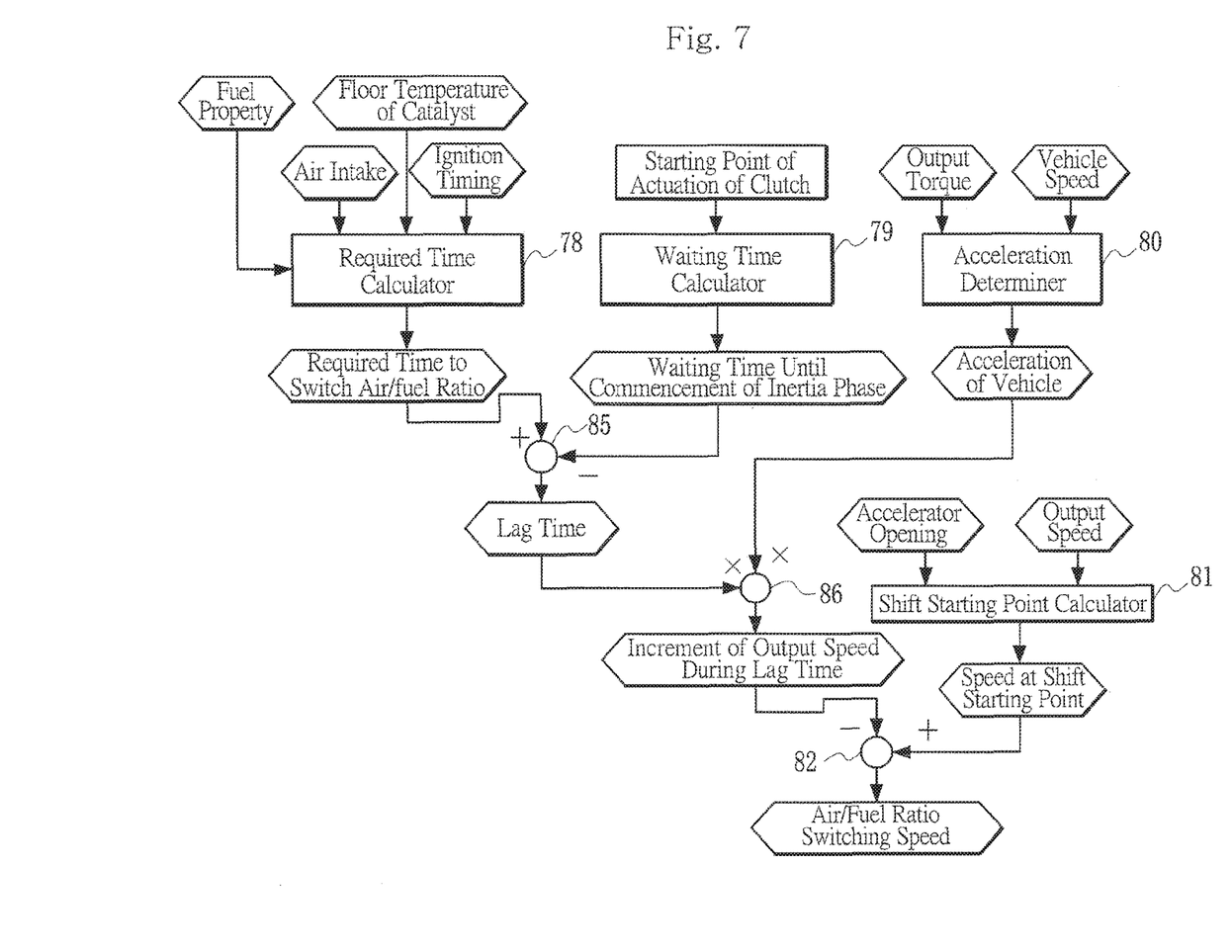
FIG. 7 is an explanatory chart showing a procedure for calculating the air/fuel ratio switching speed.

FIG. 7 is an explanatory chart showing a procedure for calculating the air/fuel ratio switching speed of an output speed of the transmission 51. As shown in FIG. 7, the required time calculator 78 is configured to calculate a required time to switch the air/fuel ratio from the lean-burn ratio to the stoichiometric ratio based on a fuel property detected by the fuel property sensor 72, an air intake detected by the airflow sensor 26, a floor temperature of the catalyst 21 detected by the temperature sensor 32, an ignition timing detected by the crank angle sensor 24 and so on. It is to be noted that the required time to switch the air/fuel ratio is increased with an increase in the air intake. That is, the air intake is the most important parameter to determine the required time to switch the air/fuel ratio from the lean-burn ratio to the stoichiometric ratio, and hence the other parameters may be omitted according to need.

The waiting time calculator 79 calculates a waiting time until the commencement of an inertia phase from a commencement of shifting operation of the transmission 51. Specifically, the waiting time calculator 79 is configured to calculate a period of time from a point at which the frictional engagement element or the hydraulic actuator is actuated to shift a gear stage (i.e., a shift starting point) to a starting point of the inertia phase. Such waiting time may not only be a compatible value determined depending on a model of the vehicle but also a constant value. If the waiting time is determined in advance, the waiting time may be stored into the ROM 66.

At the shift starting point, specifically, a shifting command to execute a shifting operation of gear stage of the transmission 51 is transmitted from the shift controller 74. The inertia phase starts from a point at which a rotational speed of the input shaft 52 of the transmission 51 is started to be changed from a synchronous speed with an output speed of an output member in the current gear stage, to a point at which the rotational speed of the input shaft 52 of the transmission 51 is raised to a speed to be synchronized with an output speed of the output member in the gear stage achieved after the shifting operation.

Optionally, the waiting time until the commencement of inertia phase may also be determined based on a depression of the accelerator pedal 29 while with reference to a map. Further, the waiting time until the commencement of inertia phase may also be determined in advance in accordance with the shift pattern. In this case, a torque transmitting capacity of the frictional engagement element (or the hydraulic command transmitted thereto) may be determined in accordance with the waiting time thus determined in advance.

The required time to switch the air/fuel ratio and the waiting time until the commencement of inertia phase thus calculated are sent to a first subtractor 85 to calculate a lag time from a starting point of switching the air/fuel ratio to the shift starting point by subtracting the waiting time until the commencement of inertia phase from the required time to switch the air/fuel ratio.

The ECU 11 further comprises a torque calculator that calculates an output torque of the engine 10 based on a depression of the accelerator pedal 29 and a speed of the engine 10. The acceleration determiner 80 is configured to calculate a current acceleration of the vehicle based on a current vehicle speed and the calculated output torque of the engine 10 or a target torque. In addition, the acceleration determiner 80 is further configured to estimate a future acceleration to be expected with a current depression of the accelerator pedal 29 based on the current acceleration and a road gradient, so as to estimate a future output speed of the transmission 51.

The estimated acceleration and the above-explained lag time calculated by the first subtractor 85 are sent to a multiplier 86. The multiplier 86 calculates a component of acceleration by multiplying the estimated acceleration by the lag time, and estimates an increment of the vehicle speed during the lag time based on the calculated component of acceleration. Then, an increment of output speed of the transmission 51 during the lag time is calculated based on the estimated vehicle speed.

The shift starting point calculator 81 computes a time point at which a shifting operation of the transmission 51 is started by actuating the engagement elements of the transmission 51 or the hydraulic actuator, based on a current depression of the accelerator pedal 29 and a current output speed of the transmission 51. Then, the shift starting point calculator 81 estimates an output speed of the transmission 51 at the shift starting point based on a length of the lag time from the starting point of switching the air fuel ratio to the shift starting point.

The increment of output speed of the transmission 51 during the lag time is subtracted from the output speed of the transmission 51 at the shift starting point by a second subtractor 84 to obtain an output speed of the transmission 51 to switch an air/fuel ratio (i.e., the air/fuel ratio switching speed). Here, the switching speed calculator 82 always calculates the air/fuel ratio switching speed as long as the condition to switch the air/fuel ratio to the lean-burn ratio is satisfied.

Figure 8:
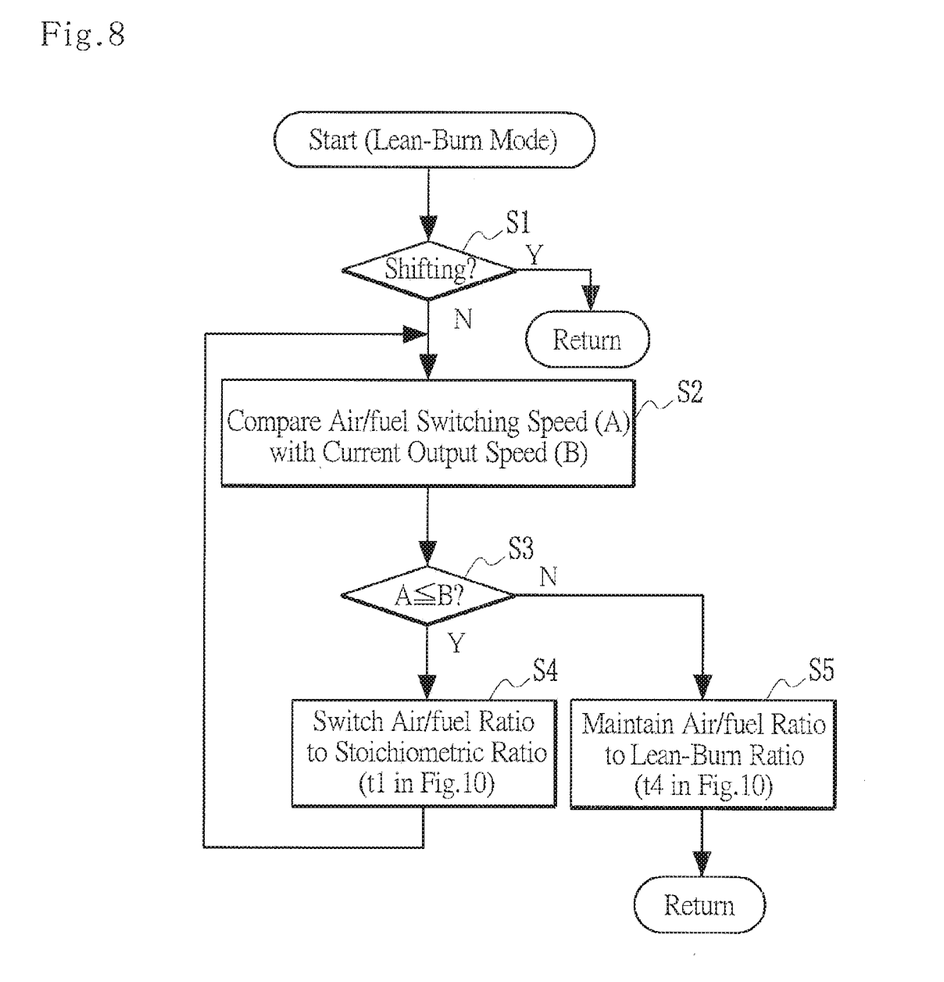
FIG. 8 is a flowchart showing a control example for switching the air/fuel ratio.

Turning to FIG. 8, there is shown a control example to switch the air/fuel ratio by the switching commander 83 during propulsion in the lean-burn mode. First of all, it is determined at step S1 whether or not a shifting operation of the transmission 51 is being carried out. If the shifting operation of the transmission 51 is not currently carried out so that the answer of step S1 is NO, the routine progresses to step S2 to compare the air/fuel ratio switching speed (A) with the current output speed of the transmission 51 (B). By contrast, if the shifting operation of the transmission 51 is currently carried out so that the answer of step S1 is YES, the routine is returned. Then, at step S3, it is determined whether or not the air/fuel ratio switching speed (A) is equal to or smaller than the current output speed of the transmission 51 (B). If the air/fuel ratio switching speed (A) is equal to or smaller than the current output speed of the transmission 51 (B) so that the answer of step S3 is YES, the routine progresses step S4 to switch the air/fuel ratio to the stoichiometric ratio. By contrast, if the current output speed of the transmission 51 (B) is lower than the air/fuel ratio switching speed (A) so that the answer of step S3 is NO, the routine progresses step S5 to maintain the air/fuel ratio to the lean-burn ratio. Then, the routine is returned.

Figure 9:
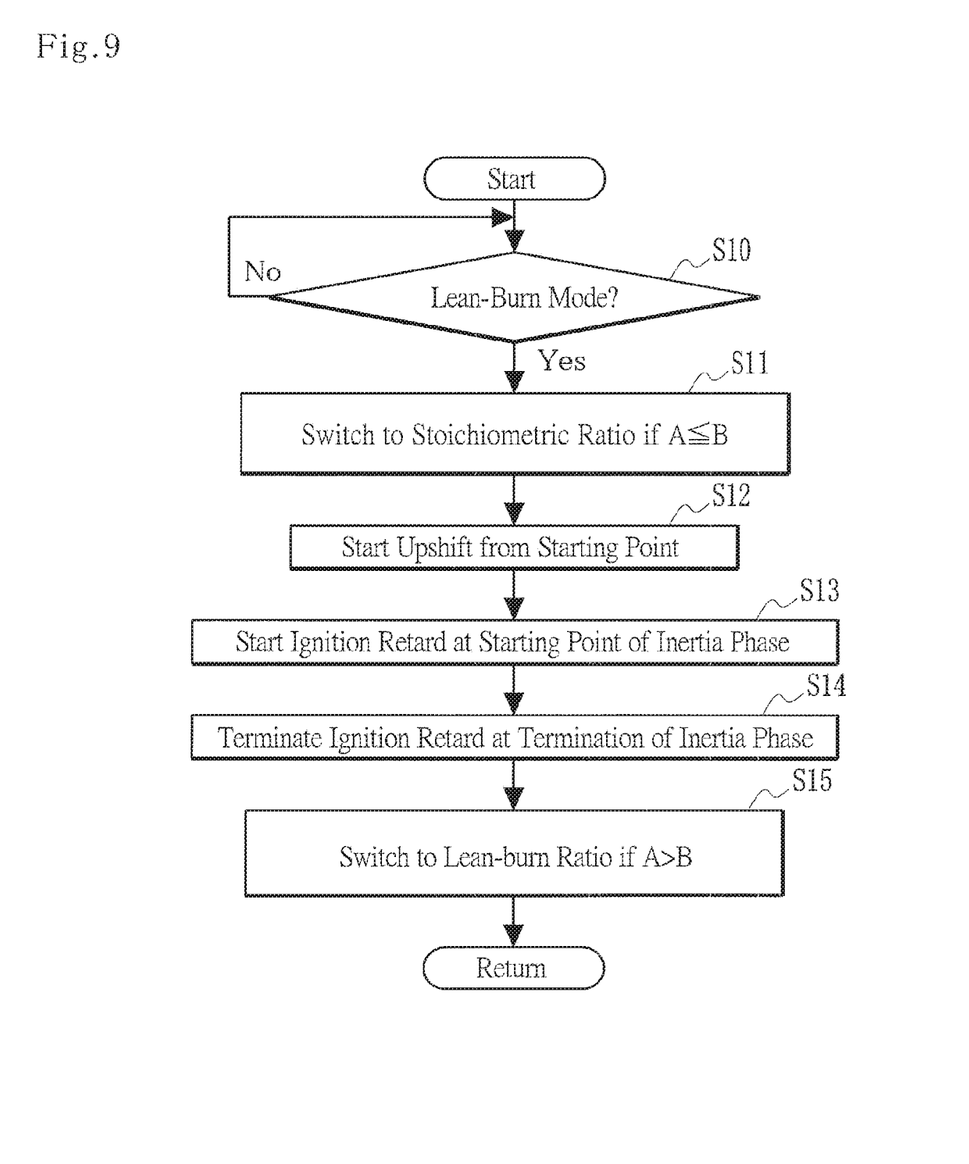
FIG. 9 is a flowchart showing a control example for switching the air/fuel ratio to stoichiometric ratio.

Turning to FIG. 9, there is shown a control example to execute the ignition retard of the engine 10 when the power-on upshift is demanded while switching the air/fuel ratio. First of all, it is determined at step S10 whether or not the vehicle is currently propelled in the lean-burn mode by the determiner 49. Such determination of step S10 is made constantly as long as the engine 10 is in operation. If the vehicle is propelled in the lean-burn mode so that the answer of step S10 is YES, the routine progresses to step S11 to switch the air/fuel ratio to the stoichiometric ratio upon satisfaction of the above-explained condition of step S3 shown in FIG. 8. By contrast, if the vehicle is not propelled in the lean-burn mode so that the answer of step S10 is NO, the routine is returned.

Then, at step S12, a command to start the power-on upshift is transmitted from the shift controller 74 at the shift starting point when the output speed of the transmission 51 reaches the estimated output speed of the transmission 51 at the shift starting point. Then, the ignition retard of the engine 10 is started at step S13 from a starting point of the inertia phase, and terminated at step S14 when the inertia phase is terminated.

Specifically, the point at which the inertia phase is terminated may be determined based on a face that the input speed of the transmission 51 reaches a synchronous speed with a speed of the output member in the gear stage to be achieved after the upshift.

Thereafter, when the current output speed of the transmission 51 (B) falls below the air/fuel ratio switching speed (A), the air/fuel ratio is switched to the lean-burn ratio at step S15. Here, the ignition retard of the engine 10 may be continued after the termination of the inertia phase as long as the stoichiometric mode is maintained.

Figure 10:
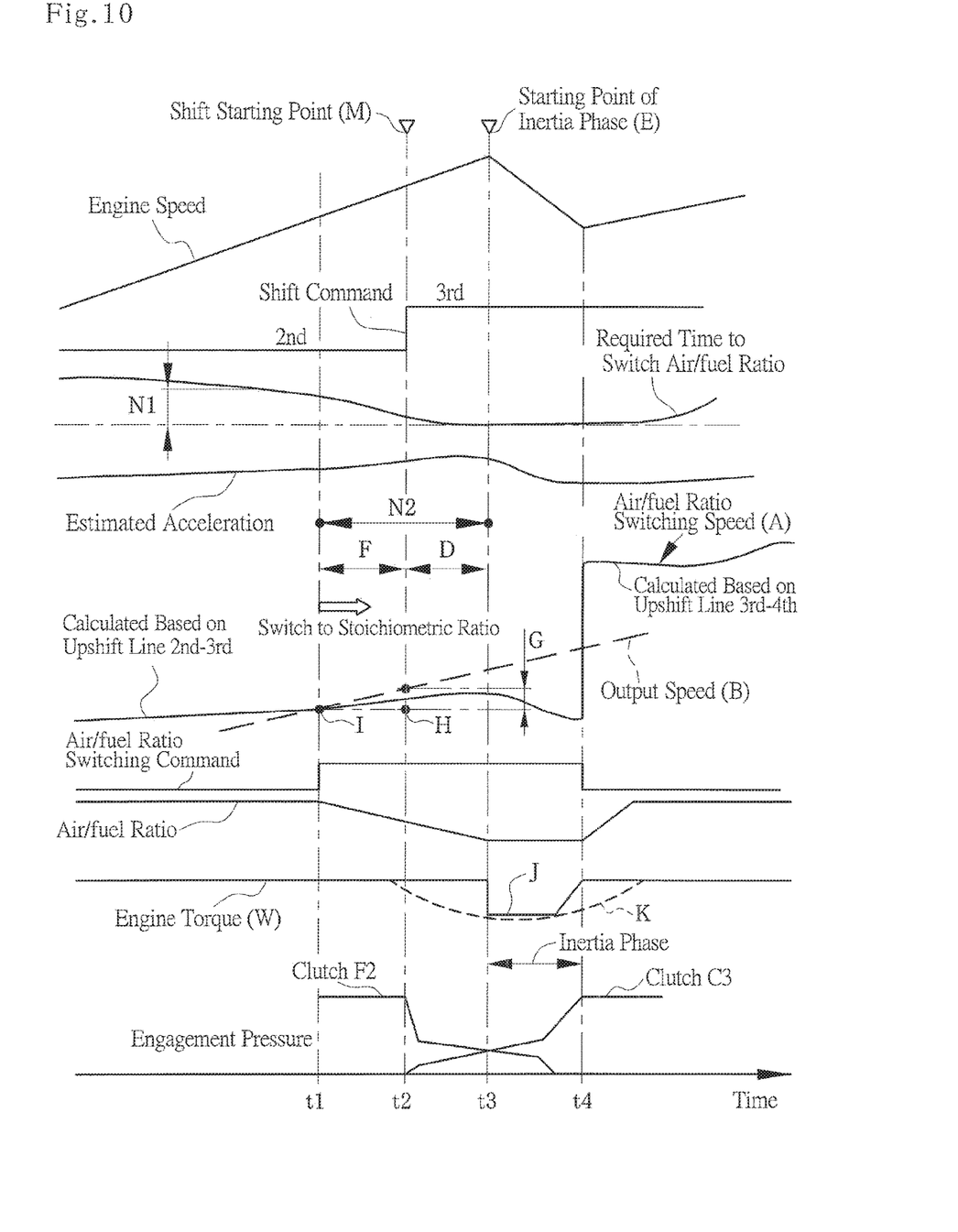
FIG. 10 is a time chart during a switching operation of the air/fuel ratio.

Turning to FIG. 10, there is shown a time chart during execution of a power-on upshift from the 2nd stage to the 3rd stage while switching the air/fuel ratio. As described, the required time calculator 78 continuously calculates the required time (N) to switch the air/fuel ratio from the lean-burn ratio to the stoichiometric ratio. At point t1, the condition explained at step S3 in FIG. 8 to switch the air/fuel ratio to the stoichiometric ratio is satisfied, that is, the current output speed of the transmission 51 (B) exceeds the air/fuel ratio switching speed (A) and hence a command to switch the air/fuel ratio to the stoichiometric ratio is outputted. Consequently, the required time (N2) starts from the point t1. In the time chart shown in FIG. 10, a length of the required time (N2) corresponds to a vertical interval (N1) between a solid curve representing the required time (N) and a reference dashed dotted line.

At point t2, an actual output speed of the transmission 51 (B) reaches an estimated speed (H) at a timing expected to start an upshift, and hence a command to carry out the power-on upshift is outputted at point t2. Consequently, the shift starting point (M) is set to the point t2. In this situation, a clutch-to-clutch shifting is commenced to shift the gear stage of the transmission 51 from the 2nd stage to the 3rd stage. Specifically, disengagement of the clutch F2 is started from point t2, and the waiting time (D) until the commencement of inertia phase starts from the point t2. Then, a rotational speed of the input shaft 52 of the transmission 51 starts changing at point t3 from the synchronous speed in the 2nd stage. Consequently, the starting point (E) of inertia phase is set to a termination point of the waiting time (D), that is, to the point t3. In this situation, the air/fuel ratio is shifted completely to the stoichiometric ratio, therefore, the required time (N2) is also terminated at the point t3.

As a result of thus determining a length of the required time (N2) to switch the air/fuel ratio from the lean-burn ratio to the stoichiometric ratio, and setting the shift starting point (M) to the point t2 and the starting point (E) of inertia phase to the point t3, the first subtractor 85 subtracts the waiting time (D) from the required time (N2) to obtain a length of the lag time (F) from the starting point of switching the air/fuel ratio to the shift starting point (M).

Specifically, the first air/fuel ratio switching speed (A) of the output speed of the transmission 51 at point t1 to shift the air/fuel ratio from the lean-burn ratio to the stoichiometric ratio is calculated by subtracting an increment (G) of the output speed of the transmission 51 (B) during the lag time (F) from the estimated speed (H) of the output speed of the transmission 51 (B) at point t2. As described, an increment (G) of the output speed of the transmission 51 (B) during the lag time (F) is calculated by multiplying the estimated acceleration (P) by a length of the lag time (F). When the air/fuel ratio is shifted completely to the stoichiometric ratio at point t3, the ignition retard of the engine 10 is commenced, and the ignition retard of the engine 10 is continued until point t4.

That is, the power-on upshift from the 2nd stage to the 3rd stage is completed at point t4 and hence the inertia phase is terminated. In this situation, the accelerator pedal 29 is depressed again to commence a power-on upshift at the point t4 from the 3rd stage to the 4th stage. Consequently, the output speed of the transmission 51 (B) reaches the second air/fuel ratio switching speed (A), and hence a command to switch the air/fuel ratio from the stoichiometric ratio to the lean-burn ratio is outputted at point t4. Specifically, the second air/fuel ratio switching speed (A) to shift the air/fuel ratio from the stoichiometric ratio to the lean-burn ratio is calculated based on another shift starting point (M) from the 3rd stage to the 4th stage by the same procedure to calculate the first air/fuel ratio switching speed (A).

Thus, according to the embodiment, a length of time to propel the vehicle in the lean-burn mode can be extended as long as possible so that the fuel consumption can be reduced as much as possible. In addition, since the ignition retard of the engine 10 is executed only in the stoichiometric mode after the commencement of the inertia phase, misfire of the engine 10 can be prevented certainly. Further since the air/fuel ratio is switched to the stoichiometric ratio prior to the commencement of the inertia phase, a limit value of a retard angle of the crankshaft can be increased so that a timing of the torque down represented by "J" in FIG. 10 can be controlled accurately within a time rage "K" indicated by a dashed line in FIG. 10.

Although the above exemplary embodiments of the present application have been described, it will be understood by those skilled in the art that the present application should not be limited to the described exemplary embodiments, and various changes and modifications can be made within the spirit and scope of the present application. For example, the vehicle control system may also be applied to a hybrid vehicle having an electric motor serving as a prime mover. In addition, a belt-driven continuously variable transmission may also be used as the geared automatic transmission 51. Further, a manual transmission may be used instead of the torque converter 42.

What is claimed is:

1. A vehicle control system that is applied to a vehicle comprising:
    an engine in which an operating mode can be switched between a stoichiometric mode in which an air/fuel ratio is set to a stoichiometric ratio, and a lean-burn mode in which the air/fuel ratio is set to a lean-burn ratio; and
    a transmission that changes an input speed from the engine;
    the vehicle control system comprising:
    a controller that controls the engine and the transmission;
    wherein the controller is configured to
    determine a starting point of an inertia phase in which an input speed of the transmission is changed from a speed in a current gear stage toward a speed in the gear stage to be achieved after a shifting operation of the gear stage of the transmission, when the shifting operation is demanded during propelling the vehicle in the lean-burn mode,
    switch the operating mode of the engine from the lean-burn mode to the stoichiometric mode before the starting point of the inertia phase, and
    execute an ignition retard of the engine during propelling the vehicle in the stoichiometric mode.

2. The vehicle control system as claimed in claim 1, wherein the controller is further configured to:
    determine a required time to switch the air/fuel ratio between the stoichiometric ratio and the lean-burn ratio based on at least an air intake of the engine, and
    start switching the air/fuel ratio from the lean-burn ratio to the stoichiometric ratio before the starting point of the inertia phase.

* * * * *